US006237448B1

(12) United States Patent
Haxton

(10) Patent No.: US 6,237,448 B1
(45) Date of Patent: May 29, 2001

(54) GRIP TIGHTENER WRENCH SYSTEM

(76) Inventor: Michael L. Haxton, 8088 Rita Bend, Salado, TX (US) 76571

(*) Notice: Subject to any disclaimer, the term of this patent is extended or adjusted under 35 U.S.C. 154(b) by 0 days.

(21) Appl. No.: 09/118,148

(22) Filed: Jul. 17, 1998

(51) Int. Cl.[7] .......... B32B 13/52
(52) U.S. Cl. .......... 81/64; 81/179; 81/185
(58) Field of Search .......... 81/64, 60, 3.4, 81/3.43, 185, 125, 179, 90.1, 90.2

(56) References Cited

U.S. PATENT DOCUMENTS 1,464,128 * 8/1923 Coes .......... 81/64
2,370,837 * 3/1945 Boynton .......... 81/179
2,766,648 * 10/1956 Jazwieck .......... 81/64
2,801,561 * 8/1957 Bonner .......... 81/185
2,834,239 * 5/1958 Mancini .......... 81/3.43
3,029,673 * 4/1962 Godsey .......... 81/185
3,590,668 * 7/1971 Bristol .......... 81/64
4,510,825 4/1985 Neron et al. .
4,724,730 * 2/1988 Mader et al. .......... 81/90.2
4,748,875 6/1988 Lang .
4,819,521 4/1989 Lang .
4,967,612 * 11/1990 Sparling .......... 81/64
5,386,749 * 2/1995 Kim .......... 81/185
5,542,322 8/1996 Knox et al. .
5,713,248 * 2/1998 Franco .......... 81/64
5,713,251 2/1998 Zurbuchen .

* cited by examiner

*Primary Examiner*—David A. Scherbel
*Assistant Examiner*—Joni B. Danganan
(74) *Attorney, Agent, or Firm*—Derek R. Van Gilder

(57) ABSTRACT

A grip-tightener wrench system has a plurality of fastener-head contacts (18, 19, 20) on an inside periphery of a wrench enclosure (1, 21) with spring opening of a closure gap (4) between opened and closed positions. The wrench enclosure has an outside periphery with closure appendages (16, 22, 24). The wrench enclosure rotates in a wrench housing (5) having housing appendages (17, 23, 25) against which the closure appendages are forced for closing the closure gap by rotation of the wrench housing in either direction of wrench rotation to rotate a fastener head or other object positioned in the wrench enclosure. The wrench housing can be affixed to or optionally attachable to a wrench handle (8, 10, 11), a wrench insert (9) or a wrench socket (12). The fastener-head contacts can be a plurality of walls (18) or a plurality of wall corners (20). Also, the fastener-head contacts can be pointed edges (19) that penetratively grip surfaces such as rounded fastener heads, round pipes, bars or rods with various shapes.

28 Claims, 6 Drawing Sheets

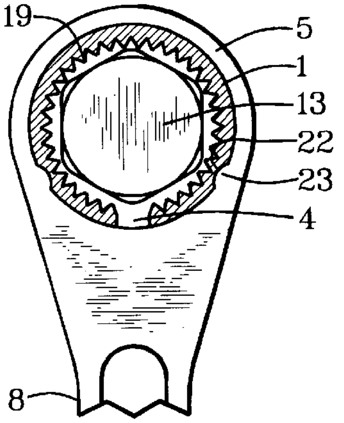
FIG. 21
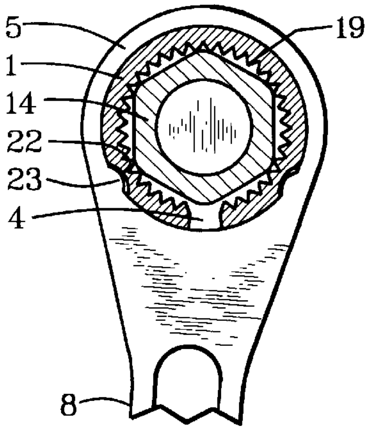
FIG. 22
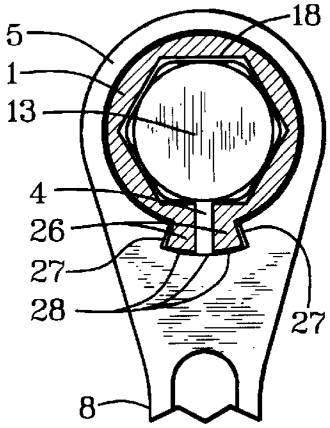
FIG. 23
FIG. 24
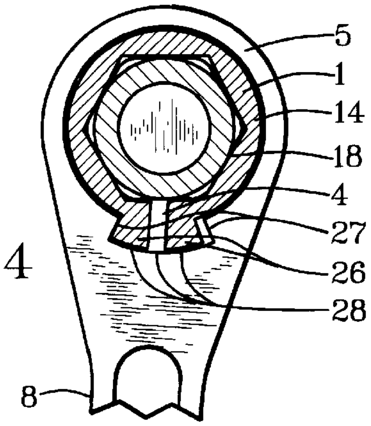
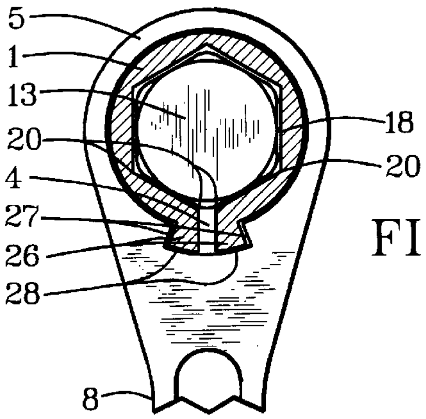
FIG. 25
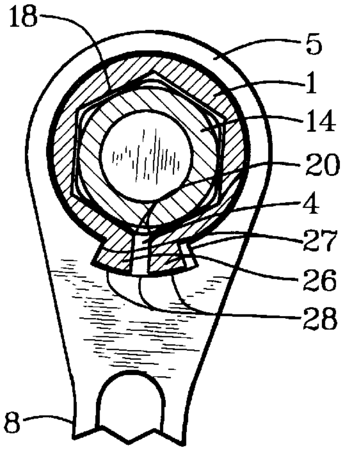
FIG. 26
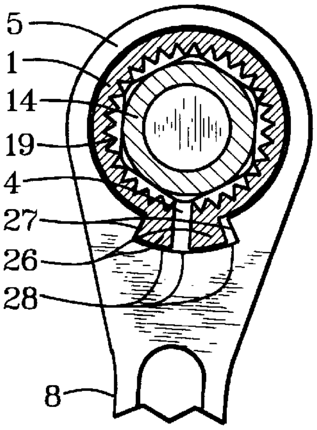
FIG. 27
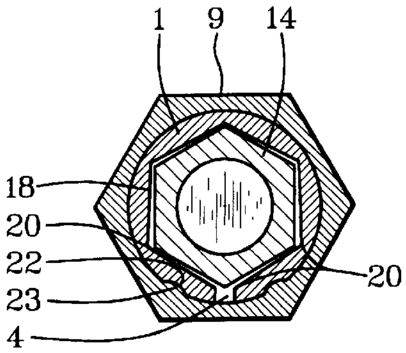
FIG. 28

GRIP TIGHTENER WRENCH SYSTEM

BACKGROUND OF THE INVENTION

1. Field of the Invention

This invention relates to wrenches and more particularly to wrenches that grip onto fastener heads such as nuts and bolts in order to prevent rounding of fastener-head corners and to grip previously rounded fastener heads or round objects such as pipes and rods.

2. Relation to Prior Art

Corners of fastener nuts and bolts often get rounded with wrenches that are loose-fitting, oversized, flexible, expandable or that do not contact enough surfaces and corners of fastener nuts and bolts to withstand rotational torque applied to them. Generally, most corner-rounding of fastener heads is caused by use of open-end wrenches and adjustable-size wrenches which are more versatile and, therefore, more readily available than limited-use box wrenches or socket wrenches. Some open-end wrenches are made thin for accessibleness but yield flexibly to high torque pressure and cause corner-rounding.

To assure snug fit of wrenches for preventing corner-rounding and to grip onto variously round objects of any kind, this wrench provides torque-actuated tightness of grip.

Examples of different but related wrenches not having the torque-actuated grip of fastener heads taught by this invention are described in the following patent documents. U.S. Pat. No. 4,510,825, issued to Neron et al, described a multi-mode wrench. U.S. Pat. No. 5,713,251, issued to Zurbuchen et al, described a glass-fiber-reinforced ratchet wrench. U.S. Pat. No. 5,542,322, issued to Knox et al, described a folding wrench for compactness. U.S. Pat. Nos. 4,819,521 and 4,748,875, issued to Lang, described a ratchet box wrench.

A known wrench for which a patent number is not known has torque-actuated grip different from this invention. It employs an internal swivel pawl in combination with three internal walls of a wrench head that are leveraged against three sides of a hex fastener head by rotational torque of the wrench. Its grasp of only three sides is not a wall-fitting grip of all sides in a manner taught by this invention. Further, the swivel pawl tends to round corners of a fourth side between fifth and sixth sides that are not contacted reliably by either the three internal walls or the swivel pawl.

SUMMARY OF THE INVENTION

In light of fastener-rounding problems with present wrenches and in light of problems of turning variously round items, objects of patentable novelty and utility taught by this invention are to provide a grip-tightener wrench system which:

prevents rounding of corners of fastener heads;

allows full-force turning of previously rounded or partially rounded fastener heads and other round or off-shaped forms such as pipes and rods;

fits onto all sizes and shapes of conventional fastener heads;

can be made for all wrench-handling;

can be made as an insert or attachable unit for present wrenches; and can be made for a single wrench to fit one-to-several sizes of fastener heads or round items.

This invention accomplishes these and other objectives with a grip-tightener wrench system having a plurality of fastener-head contacts on an inside periphery of a wrench enclosure with spring opening of a closure gap between opened and closed positions. The wrench enclosure has an outside periphery with closure appendages on opposite sides of the closure gap. The wrench enclosure rotates in a wrench housing having housing appendages against which the closure appendages are forced for closing the closure gap by rotation of the wrench housing in either direction of wrench rotation against rotational resistance of a fastener member or head positioned in the wrench enclosure. The wrench housing can be affixed to or optionally attachable to a wrench handle or socket. The fastener-head contacts can be a plurality of walls like a hex wrench, a plurality of corners like a twelve-cornered wrench or it can be similar to other wrench-like enclosures. Also, the fastener-head contacts can be pointed edges that penetratively grip surfaces such as rounded fastener heads, round pipes, bars or rods with various shapes.

BRIEF DESCRIPTION OF DRAWINGS

This invention is described by appended claims in relation to description of a preferred embodiment with reference to the following drawings which are described briefly as follows:

FIG. 21 is the FIG. 19 illustration with material-penetrative wrench-enclosure edges on a rounded fastener-bolt head;

FIG. 22 is the FIG. 21 illustration in tightened mode on a rounded fastener nut;

FIG. 23 is a side view of a grip-tightener wrench on a fastener bolt in un-tightened mode with stops in slots for actuating the wrench enclosure;

FIG. 24 is the FIG. 23 illustration in tightened mode on a fastener nut;

FIG. 25 is the FIG. 23 illustration with a closure gap at a corner of wrench walls;

FIG. 26 is the FIG. 25 illustration in tightened mode on a fastener nut;

FIG. 27 is the FIG. 26 illustration with material-penetrative wrench-enclosure edges;

FIG. 28 is a side view of a grip-tightener wrench with a hexagonal housing for use as an insert in conventional wrenches;

DESCRIPTION OF PREFERRED EMBODIMENT

Terms used to describe features of this invention are listed below with numbering in the order of their initial use with reference to the drawings. These terms and numbers assigned to them designate the same features wherever used throughout this description.

| | | | |
|---|---|---|---|
| 1. | Wrench enclosure | 18. | Wrench-enclosure |
| 2. | Outside periphery of wrench enclosure | 19. | Material-penetrative wrench-enclosure edges |
| 3. | Inside periphery of wrench enclosure | 20. | Wall corners |
| | | 21. | Wrench-enclosure sections |
| 4. | Closure gap | 22. | Enclosure cam valleys |
| 5. | Wrench housing | 23. | Housing cam peaks |
| 6. | Inside periphery of wrench housing | 24. | Enclosure cam peaks |
| | | 25. | Housing cam valleys |
| 7. | Outside periphery of wrench housing | 26. | Stop appendages |
| | | 27. | Stop walls |
| 8. | End wrench | 28. | Stop channel |
| 9. | Wrench insert | 29. | Drive aperture |
| 10. | Size-difference double-end wrench | 30. | Fastener entry |
| | | 31. | Retainer ridges |
| 11. | Feature-difference double-end wrench | 32. | Retainer grooves |
| | | 33. | Section-retainer ridges |
| 12. | Wrench socket | 34. | Section-retainer slots |

-continued

| | | | |
|---|---|---|---|
| 13. | Hex fastener-bolt head | 35. | Closure-section springs |
| 14. | Hex fastener nut | | |
| 15. | Pipe | | |
| 16. | Cams | | |
| 17. | Cam followers | | |

Figure 29:
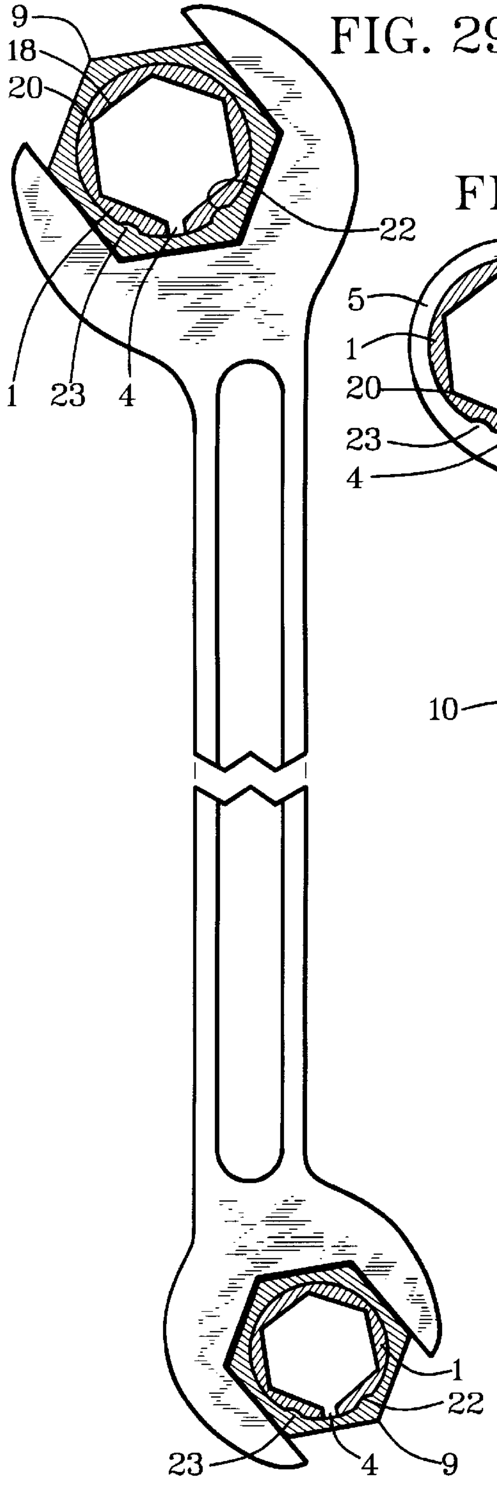
FIG. 29 is a side view of a proportionately large grip-tightener-wrench insert in one end and a proportionately small grip-tightener-wrench insert in an opposite end of a conventional open-end wrench.
Figure 30:
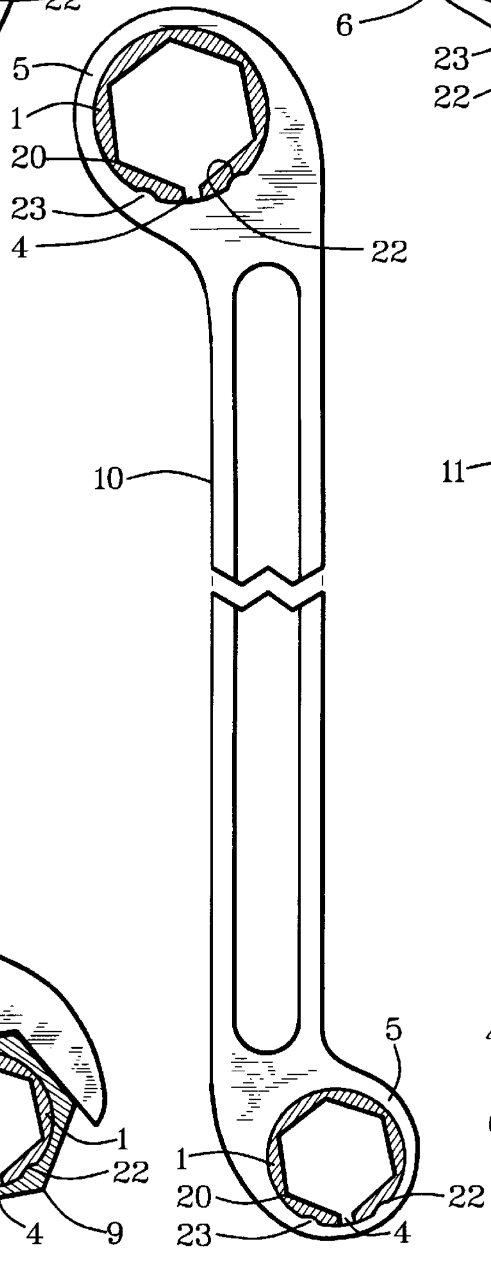
FIG. 30 is a side view of a proportionately large grip-tightener wrench in one end and a proportionately small grip-tightener wrench with similar features in an opposite end of a double-end grip-tightener wrench.
Figure 31:
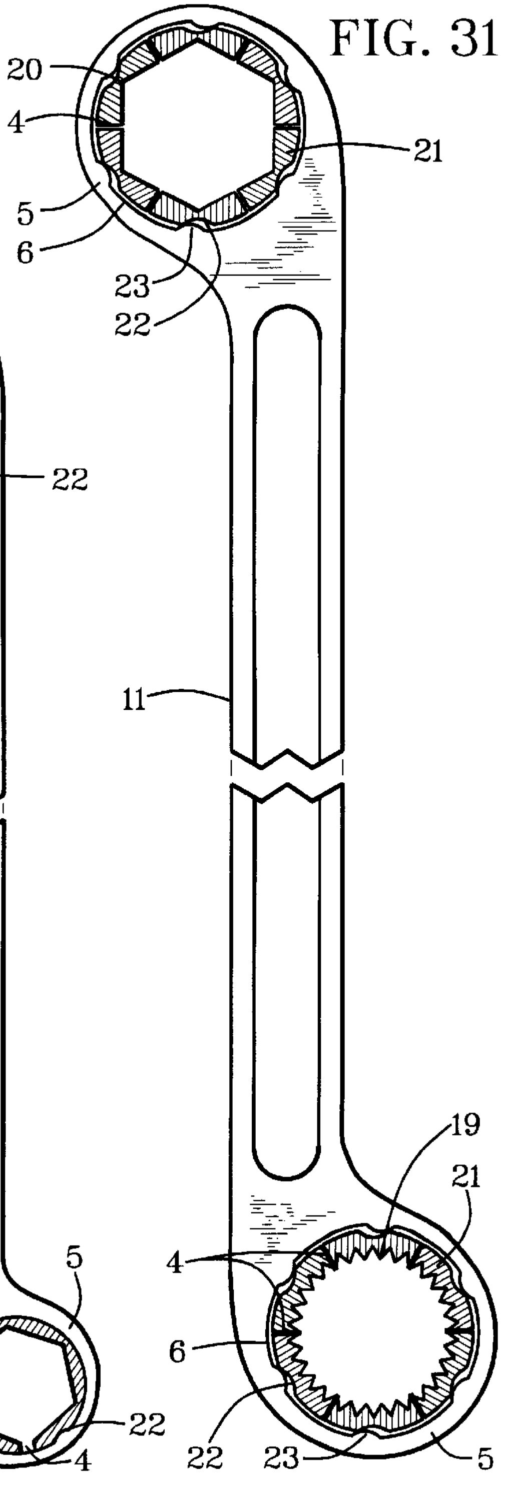
FIG. 31 is a side view of a double-end grip-tightener wrench having grip-tightener wrenches with different features at opposite ends.
Figure 32:
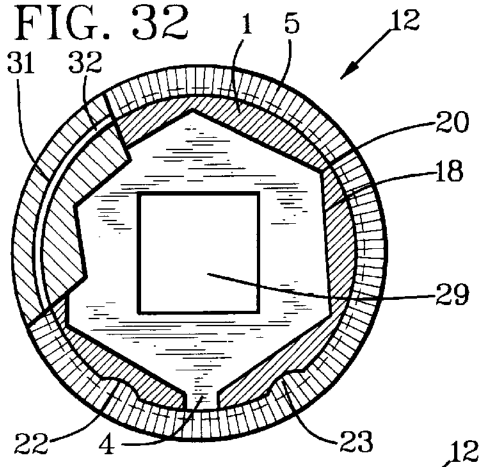
FIG. 32 is a partially cutaway top view of a grip-tightener socket wrench.
Figure 33:
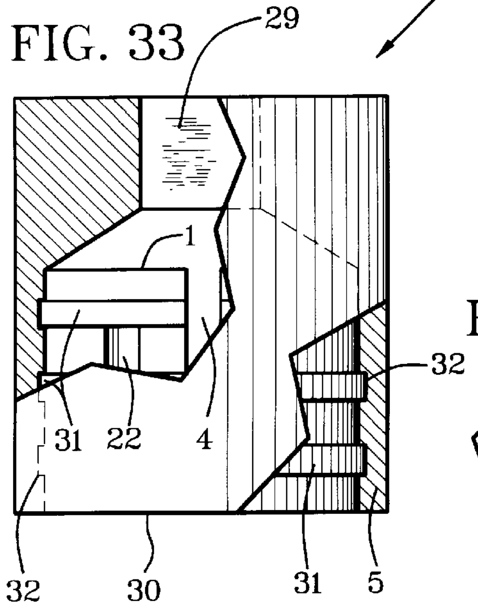
FIG. 33 is a partially cutaway side view of the FIG. 32 illustration.

Reference is made first to FIGS. 1–7 and to other FIGS. as indicated. A wrench enclosure 1 has an outside periphery 2, an inside periphery 3 and at least one closure gap 4. A wrench housing 5 encompasses the wrench enclosure with an inside periphery 6 in which the wrench enclosure 1 rotates. The wrench housing has an outside periphery 7 which is adaptable to a desired handle for predetermined wrench applications. The grip-tightener wrench can be employed for such applications as an end of an end wrench 8 as depicted in FIGS. 1–27, a wrench insert 9 as depicted in FIGS. 28–29, a size-difference double-end wrench 10 as depicted in FIG. 30, a feature-difference double-end wrench 11 as depicted in FIG. 31 and a wrench socket 12 as depicted in FIGS. 32–33.

Figure 1:
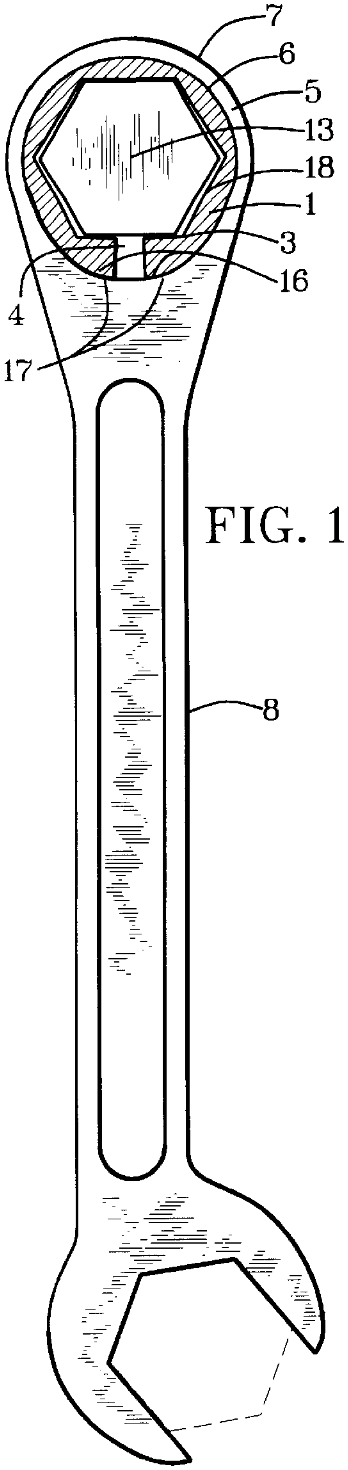
FIG. 1 is a side elevation view of a grip-tightener wrench in un-tightened mode on an end of a conventional open-end wrench.
Figure 2:
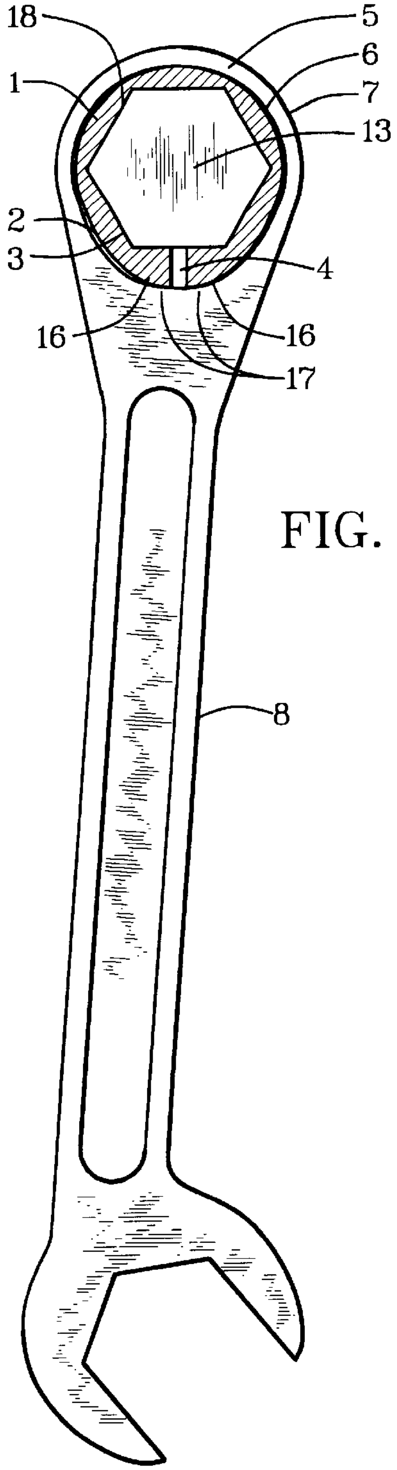
FIG. 2 is a side view of the FIG. 1 illustration in tightened mode from being partially rotated.
Figure 3:
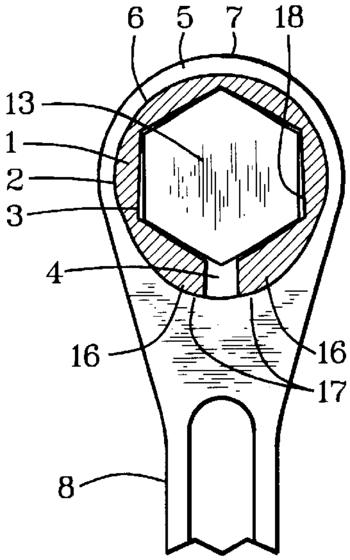
FIG. 3 is a side view of a wrench-head portion of a grip-tightener wrench having a corner-positioned closure gap in un-tightened mode.
Figure 4:
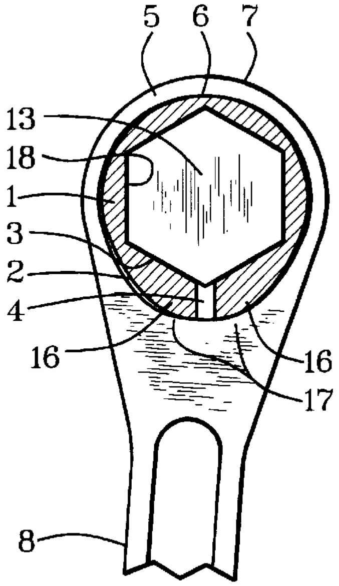
FIG. 4 is the FIG. 3 illustration in tightened mode.
Figure 5:
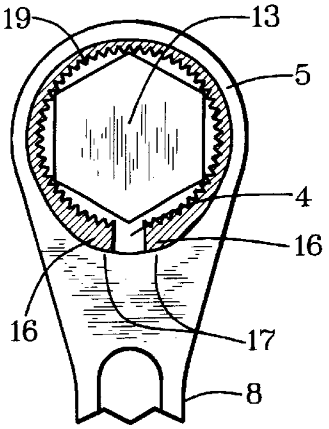
FIG. 5 is a side view of a grip-tightener wrench having material-penetrative wrench-enclosure edges with an eccentric cam closure in un-tightened mode.
Figure 6:
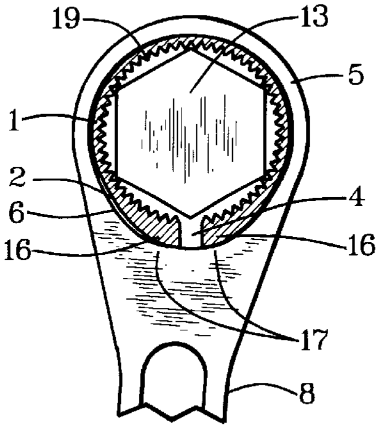
FIG. 6 is the FIG. 5 illustration in tightened mode on a fastener such as a bolt head.
Figure 7:
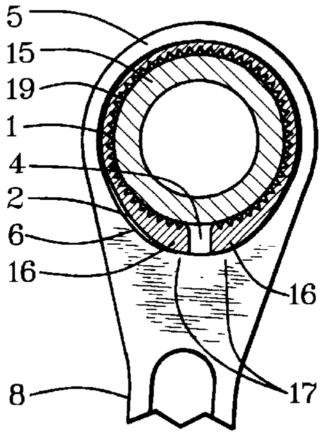
FIG. 7 is the FIG. 5 illustration in tightened mode on a round object such as a pipe.

Rotation of the wrench housing 5 tightens grip of the wrench enclosure 1 on a targeted object such as a hex fastener-bolt head 13 depicted in FIGS. 1–6, 8, 10–11, 21, 23 and 25, a hex fastener nut 14 depicted in FIGS. 9, 12–13, 15–20, 22, 24,and 26–28 or a round object such as a pipe 15 depicted in FIG. 7. In FIGS. 21, 23 and 25, corners of the hex fastener-bolt heads 13 are shown rounded and in FIGS. 22, 24, 26 and 27, corners of the hex fastener nuts 14 are shown rounded to illustrate relationship of roundness to grip-tightening features of the grip-tightener wrench.

Grip tightening is accomplished by engagement of closure portions with housing portions in opposition to rotation of the wrench enclosure 1 and the wrench housing 5 by an object such as a hex fastener-bolt head 13, a hex fastener nut 14 or a round or rounded object such as a pipe 15. The closure portions can be cams 16 extended radially from the outside periphery 2 of the wrench enclosure 1 at oppositely disposed sides of a single closure gap 4 as shown in FIGS. 1–7 and 36–37. The housing portions can be cam followers 17 extended radially from the inside periphery 6 of the wrench housing 5. The outside periphery 2 of the wrench enclosure 1 is rounded at circumferentially opposite sides of the cams 16. Correspondingly, the inside periphery 6 of the wrench housing 5 is rounded to receive the outside periphery 2 of the wrench enclosure 1 with sliding contact. The cams 16 have cam extensions and cam profiles to be engaged by the cam followers 17 and the cam followers 17 have follower extensions and follower profiles to engage the cams 16 for closing the closure gap 4 to tighten a plurality of fastener-member contacts onto a fastener member or other targeted object by rotation of the wrench housing 5. Profiles of the cams 16 have heights and the cam followers 17 have depressions that define extent of rotation for closing the wrench enclosures 1. Low profiles require more rotation and high profiles decrease rotation required for tightening.

The plurality of fastener-member contacts can be wrench walls 18 as depicted in FIGS. 1–4, 8, 10–11, 15–20, 23–24, and 36–37. Optionally, the plurality of fastener-member contacts can be material-penetrative wrench-enclosure edges 19 as depicted in FIGS. 5–7, 14, 21–22, 27 and 31 or wall corners 20 as depicted in FIGS. 9, 12–13, 19–20, 25–26, 28–30 and 32–33.

For the embodiment shown in FIGS. 1–7 and 36–37, the wrench enclosure 1 is an eccentric cylinder having thickness from-side-to-side that is slightly larger than a typical fastener-bolt head or nut and rotates in the wrench housing 5 that is shaped to receive the wrench enclosure 1 in sliding contact. The wrench enclosure 1 has spring-tensioned opening that causes the wrench enclosure 1 to spread at the closure gap 4 and fill the inside periphery 6 of the wrench housing 5 when not being rotated. When being rotated against resistance of a targeted hexagonal or variously round object, sides of the wrench housing 5 close the closure gap 4 partially or fully and cause fastener-member contacts such as wrench-enclosure walls 18, material-penetrative wrench-enclosure edges 19 or wall corners 20 to grip the targeted object. This leaves a small space between an outside periphery 2 of the wrench enclosure 1 and an inside periphery 6 of the wrench housing 5 at a side opposite to a direction of rotation. The small space is depicted in FIGS. 2, 4, 6 and 7.

The single closure gap 4 can be either in a wrench wall 18 as depicted in FIGS. 1–2, 15–16, 18, 23–24 and 37, at corners of adjacent wrench-enclosure walls 18 as depicted in FIGS. 3–4, 17, 19–20, 29–30 and 32–33 or between adjacent material-penetrative wrench-enclosure edges 19 as depicted in FIGS. 5–7, 14, 21–22, 27 and 31.

Referring to FIGS. 8–14, 31, 34–35 and to other Figures. as indicated, the wrench enclosure 1 for an embodiment shown in these illustrations is a plurality of wrench-enclosure sections 21 having housing-contact sides at an outside periphery 2 and wrench-enclosure sides at an inside periphery 3. The at least one closure gap 4 is a plurality of closure gaps 4 intermediate the wrench-enclosure sections 21. As for all embodiments, the inside periphery 3 of the wrench enclosure 1 can be such fastener-member contacts as wrench-enclosure walls 18, material-penetrative wrench-enclosure edges 19 or wall corners 20, such that the inside periphery 3 of the wrench enclosure 1 is not designated separately from the wrench-enclosure walls 18, the material-penetrative wrench-enclosure edges 19 or the wall corners 20 in all of the separate Figures. in which these features are depicted. Instead, these features have different reference numbers as appropriate for particular embodiments. Similarly, the outside periphery 2 of the wrench enclosure 1 and the inside periphery 6 of the wrench housing 5 are not designated separately from particular forms for embodiments illustrated unless appropriate for effectiveness of illustration.

Figure 8:
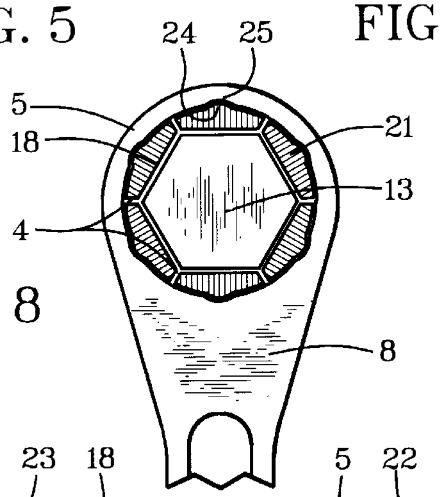
FIG. 8 is a side view of a grip-tightener wrench in un-tightened mode and having separate closure sections and separate cam valleys in a wrench housing.
Figure 9:
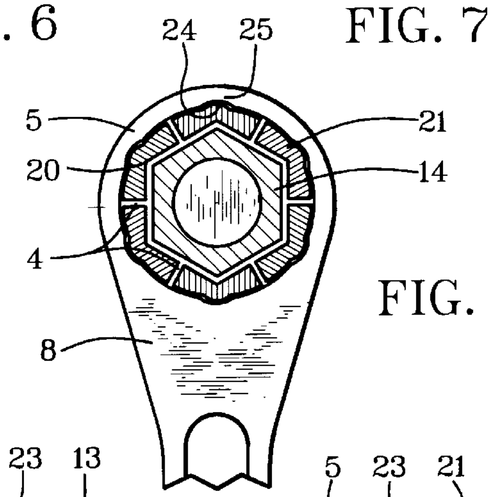
FIG. 9 is the FIG. 8 illustration with closure gaps at corners of wrench walls.
Figure 10:
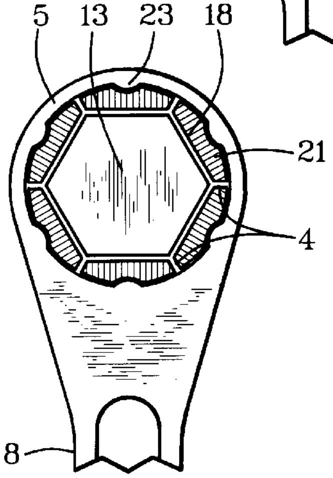
FIG. 10 is the FIG. 8 illustration with separate cam peaks in a wrench housing.
Figure 11:
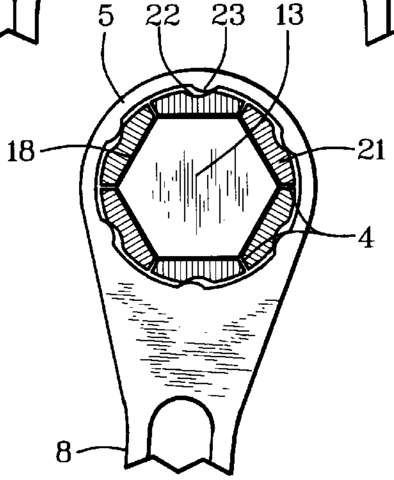
FIG. 11 is the FIG. 10 illustration in tightened mode.
Figure 12:
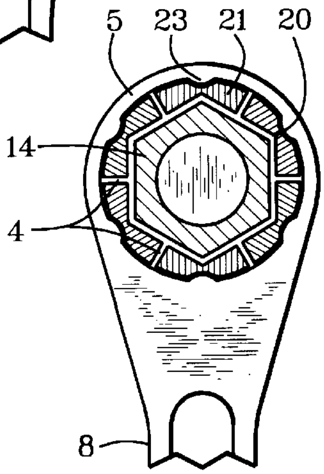
FIG. 12 is the FIG. 10 illustration with separate cam peaks at wrench corners.
Figure 13:
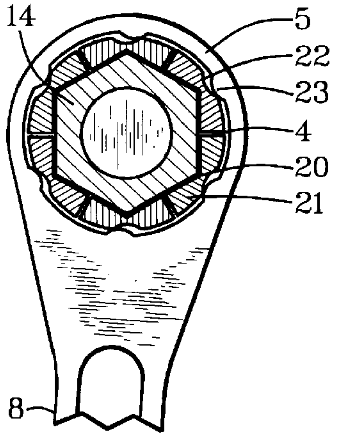
FIG. 13 is the FIG. 12 illustration in tightened mode.
Figure 14:
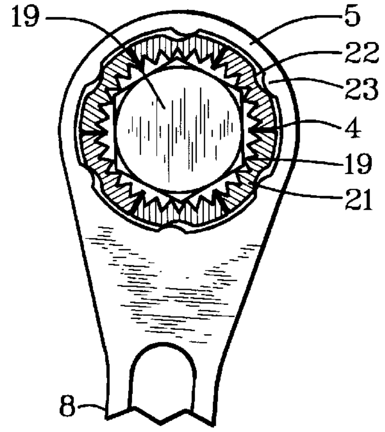
FIG. 14 is the FIG. 13 illustration with material-penetrative wrench-enclosure edges tightened onto a fastener-bolt head.
Figure 15:
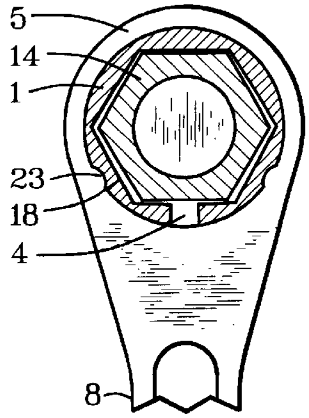
FIG. 15 is a side view of a grip-tightener wrench having a round wrench enclosure with a plurality of two cam peaks in a wrench housing and being in an un-tightened mode.

The housing-contact sides of the wrench-enclosure sections 21 have wrench-enclosure cam configurations that are enclosure cam valleys 22 which are oppositely disposed from wrench-housing cam configurations that are housing cam peaks 23 as depicted in FIGS. 10–14 and 31. Optionally as depicted in FIGS. 8–9, the housing-contact sides of the wrench-enclosure sections 21 can have wrench-enclosure cam configurations that are enclosure cam peaks 24 which are oppositely disposed from wrench-housing cam configurations that are housing cam valleys 25. For either option, cam action forces the wrench-enclosure sections 21 inwardly when the wrench housing 5 is rotated in either direction against a targeted object.

Figure 16:
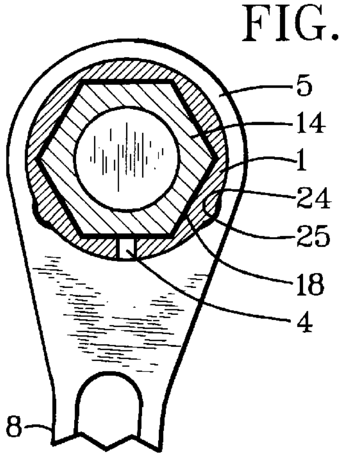
FIG. 16 is the FIG. 15 illustration with cam peaks in the wrench enclosure.
Figure 17:
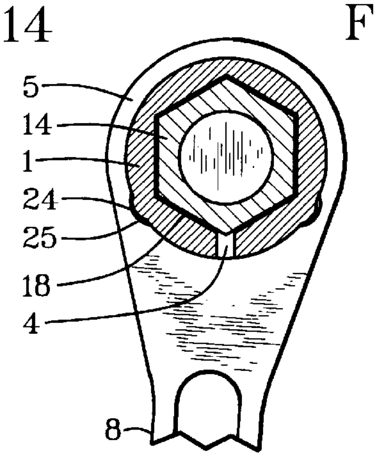
FIG. 17 is the FIG. 16 illustration in tightened mode.
Figure 18:
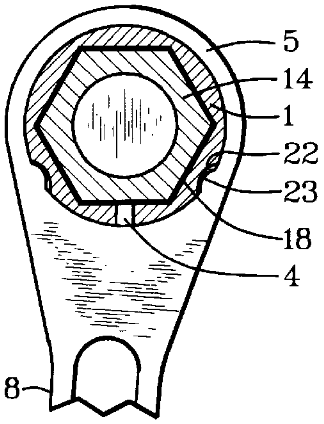
FIG. 18 is the FIG. 16 illustration with cam peaks in the wrench enclosure.
Figure 19:
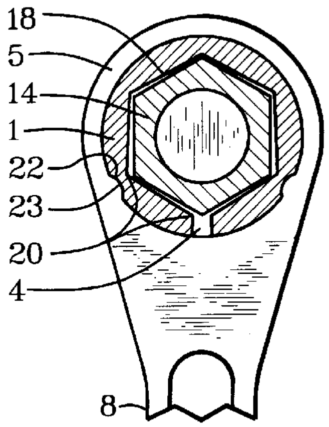
FIG. 19 is the FIG. 15 illustration with a closure gap between wrench corner walls.
Figure 20:
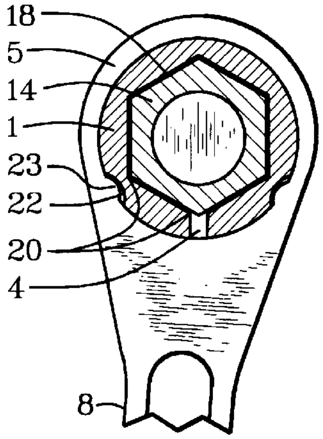
FIG. 20 is the FIG. 19 illustration in tightened mode.

Referring to FIGS. 15–22, 28, 29–30 and 32–33, the wrench enclosure 1 can have a single closure gap 4 circumferentially intermediate a plurality of preferably two wrench-enclosure cams. Oppositely disposed correspondingly, the inside periphery 6 of the wrench housing 5 can have a plurality of housing cams having housing cam configurations. A first of the two wrench-enclosure cams is positioned on a first side and a second of the two wrench-enclosure cams is positioned on a second side of the closure gap 4. Optionally, the wrench enclosure 1 can have either enclosure cam valleys 22 as depicted in FIGS. 18–22, 29–30 and 32–33 or enclosure cam peaks 24 as depicted in FIGS. 16–17. Correspondingly, the wrench housing 5 can have housing cam peaks 23 as depicted in FIGS. 18–22, 29–30 and 32–33 or housing cam valleys 25 as depicted in FIGS. 16–17.

Referring to FIGS. 23–27, the enclosure portions can be stop appendages 26 extended outward radially from the wrench enclosure 1 at oppositely disposed sides of a single closure gap 4. Coactively, the housing portions can be stop walls 27 extended inward radially from the wrench housing 5 at opposite circumferential ends of a stop channel 28 in which the stop appendages 26 travel rotationally.

Referring to FIGS. 28–29, the wrench insert 9 that is a wrench housing 5 with a hexagonal outside periphery preferably employs an embodiment of this grip-tightener wrench that can be made to have the smallest possible outside diameter. The embodiment described in relation to FIGS. 15–22, 28, and 32–33 is depicted as an example. As for other embodiments, a selection of sizes can be provided as shown for select handle advantages in relation to particular use conditions.

Referring to FIG. 30, the embodiment described in relation to FIGS. 15–22, 28–30 and 32–33 is depicted for a size-difference double-end wrench 10 having similar features with different sizes at opposite ends.

Referring to FIG. 31, the embodiment having wrench-enclosure sections 21 described in relation to FIGS. 8–14, 31 and 34–35 also can be made to have a relatively small diameter and to have low resistance to closing for use in a feature-difference double-end wrench 11. Different features at opposite ends can be wall corners 20 and material-penetrative wrench-enclosure edges 19 as shown.

Referring to FIGS. 32–33, a wrench housing 5 can be hexagonal for a wrench socket 12 that also employs features of this invention which are amenable to small diameter such as described in relation to FIGS. 15–22. The wrench socket 12 has a drive aperture 29 or other wrench connection at a top and a fastener entry 30 at a bottom. The wrench socket 12 being relatively long, in proportion to thickness of conventional end wrenches and other handles employed for this invention, can have a plurality of retainer ridges 31 extended from outside peripheries of wrench enclosures 1 for insertion into retainer grooves 32 for retaining the wrench enclosures 1 in the wrench housings 5. Thinner wrench enclosures 1 can have one retainer ridge 31 and one retainer groove 32 with similar characteristics.

Preferably the retainer ridges 31 of a fully closed wrench enclosure 1 are short enough to clear an inside periphery of a wrench housing 5 for side travel to the retainer grooves 32 for being inserted into a wrench housing 5 such as a wrench socket 12, a wrench insert 9 or selections of handle means.

Figure 34:
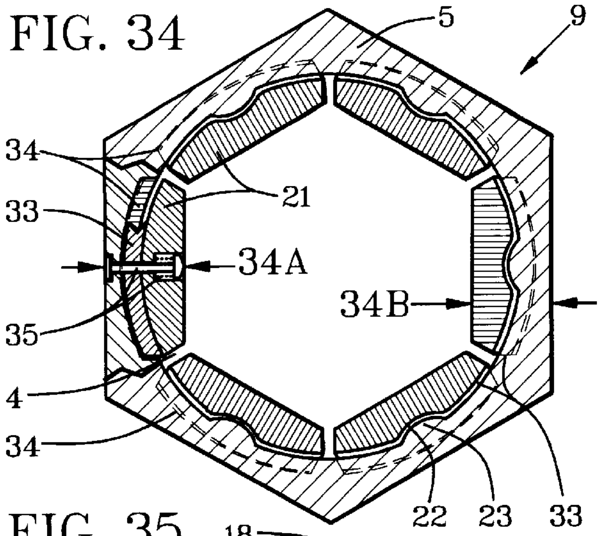
FIG. 34 is a partially cutaway top view of a grip-tightener wrench having separate closure sections with open-positioning pressure provided by closure-section springs.
Figure 35:
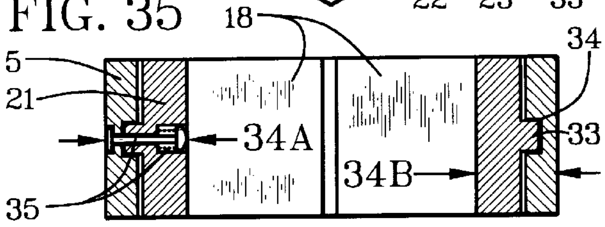
FIG. 35 is a partially cutaway side view of the FIG. 34 illustration.

Referring to FIGS. 34–35, wrench-enclosure sections 21 can have section-retainer portions such as section-retainer ridges 33 extended into section-retainer slots 34 to hold the wrench-enclosure sections 21 while being slid inward radially for engagement and outward radially for disengagement of fastener-member contacts with targeted objects for rotation. Closure-section springs 35 are employed to pressure the wrench-enclosure sections 21 outward radially for allowing entry of a targeted object into the wrench enclosure 1. The closure-section springs 35 have preferably light spring pressure to allow gripping of the targeted object without application of high torque.

Figure 36:
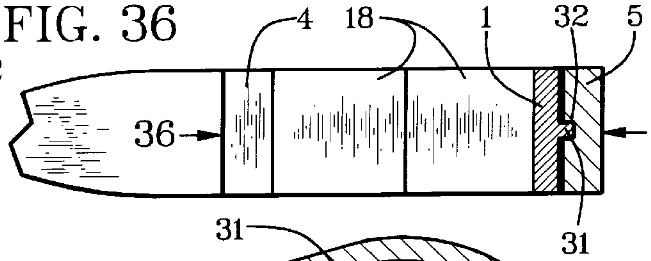
FIG. 36 is a partially cutaway side view of a grip-tightener wrench having a retainer ridge with partial-to-no height between fastener-member contacts of a wrench enclosure.
Figure 37:
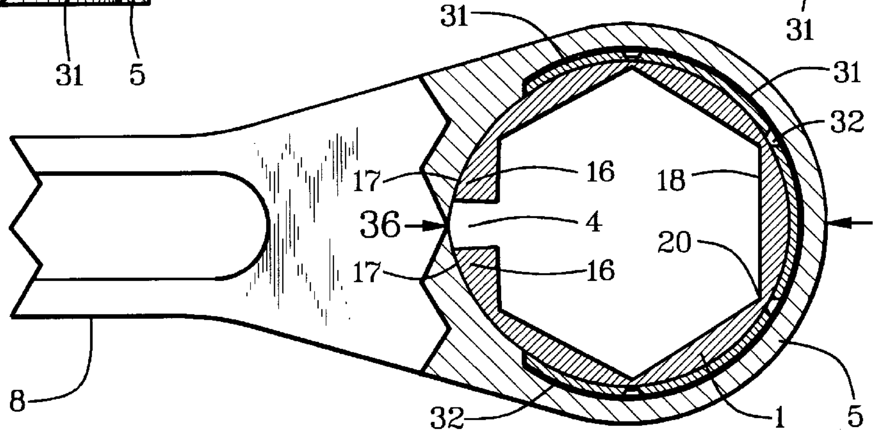
FIG. 37 is a partially cutaway top view of the FIG. 36 illustration.

Referring to FIGS. 36–37, size or height of a retainer ridge 31 in a retainer groove 32 can be reduced or omitted between fastener-member contacts such as wrench walls 18 to facilitate ease of closing a wrench enclosure 1 in a wrench housing 5. The retainer groove 32 and the retainer ridge 31 can be omitted proximate closure appendages such as cams 16 and housing appendages such as cam followers 17 as shown. The embodiment shown in FIGS. 36–37 is described further in relation to FIGS. 1–7.

Variations and combinations of features of this grip-tightener wrench are interchangeable for particular preferences. This is a broadly comprehensive wrench system with basic commonality of variants for tight wrench gripping of cornered and rounded objects.

A new and useful grip-tightener wrench system having been described, all such foreseeable modifications, adaptations, substitutions of equivalents, mathematical possibilities of combinations of parts, pluralities of parts, applications and forms thereof as described by the following claims and not precluded by prior art are included in this invention.

What is claimed is:

1. A grip-tightener wrench comprising:

a wrench enclosure having an outside periphery, an inside periphery and at least one closure gap;

a wrench housing which encompasses the wrench enclosure within an inside periphery within which the wrench enclosure rotates;

the wrench housing having an outside periphery that is adapted to predetermined wrench applications;

closure portions having predetermined curvature oppositely disposed from the closure gap on the outside periphery of the wrench enclosure;

housing portions having predetermined curvature on the inside periphery of the wrench housing at positions oppositely disposed circumferentially external from the closure portions;

the closure portions being structured for engagement by housing portions and the housing portions being structured to engage the closure portions by rotation of the wrench housing against a fastener member positioned in the wrench enclosure; and a plurality of flat fastener-member contact surfaces with predetermined fastener-grasping orientation on the inside periphery of the wrench enclosure;

wherein the closure portions are cams on oppositely disposed sides of a single closure gap;

the outside periphery of the wrench enclosure is rounded at opposite sides of the closure portions;

the housing portions are cam followers on the inside periphery of the wrench housing;

the inside periphery of the wrench housing is rounded to receive the outside periphery of the wrench enclosure with sliding contact; and the cams have cam profiles to be engaged by the cam followers and the cam followers have follower profiles to engage the cams for closing the closure gap to tighten the plurality of fastener-member contact surfaces onto the fastener member in the wrench enclosure by the rotation of the wrench housing.

2. A grip-tightener wrench as described in claim 1 wherein:

the cam profiles have heights; and the follower profiles have depressions that engage the cam profiles for actuating closure of the closure gap with a desired rate of cam action in proportion to extent of rotation of the wrench housing.

3. A grip-tightener wrench as described in claim 2 wherein:

the plurality of fastener-member contacts are a plurality of wrench-enclosure walls.

4. A grip-tightener wrench as described in claim 3 wherein:

the single closure gap is positioned in one of the wrench-enclosure walls.

5. A grip-tightener wrench as described in claim 3 wherein:

the single closure gap is positioned at a corner of two of the wrench-enclosure walls.

6. A grip-tightener wrench as described in claim 2 wherein:

the plurality of fastener-member contacts are a plurality of selectively material-penetrative wrench-enclosure edges.

7. A grip-tightener wrench as described in claim 1 wherein:

the grip-tightener wrench is an end wrench having an end to which the wrench housing is attached.

8. A grip-tightener wrench as described in claim 7 wherein:

the grip-tightener wrench is an end wrench having a first end to which a first grip-tightener wrench is attached and having a second end to which a second wrench is attached.

9. A grip-tightener wrench as described in claim 8 wherein:

the second wrench is a second grip-tightener wrench having desired different features from the first grip-tightener wrench.

10. A grip-tightener wrench as described in claim 8 wherein:

the second wrench is a conventional wrench having desired conventional-wrench features.

11. A grip-tightener wrench as described in claim 1 wherein:

the grip-tightener wrench has a fastener entry at a socket end and a drive end to which a socket rotator is attachable.

12. A grip-tightener wrench as described in claim 1 wherein:

the inside periphery of the wrench housing has at least one retainer groove having straight orthogonal walls positioned circumferentially intermediate opposite sides of the wrench housing; and the outside periphery of the wrench enclosure has at least one retainer ridge that is sized and shaped to be positioned in the retainer groove for retaining the wrench enclosure in the wrench housing.

13. A grip-tightener wrench as described in claim 12 wherein:

the closure gap is sized and shaped to allow closing of the wrench enclosure for allowing fit of the retainer ridge within the inside periphery of the wrench housing for side travel of the retainer ridge to the retainer groove.

14. A grip-tightener wrench as described in claim 13 wherein:

the wrench enclosure has enclosure-opening spring pressure of closure-section spring for retaining the retainer ridge within the retainer groove and for maintaining the wrench enclosure in an open mode for receiving fastener members prior to closing of the wrench enclosure by action of the housing appendages on the closure appendages; and the enclosure-opening pressure is low to prevent fastener-rounding resistance to closing of the wrench enclosure from rotation of the wrench housing.

15. A grip-tightener wrench as described in claim 12 wherein:

size of the retainer ridge is small between grip portions of the wrench enclosure for lightness of opening pressure of the wrench enclosure.

16. A grip-tightener wrench as described in claim 12 wherein:

portions of the retainer ridge are omitted between grip portions of the wrench enclosure for lightness of opening pressure of the wrench enclosure.

17. A grip-tightener wrench comprising:

a wrench enclosure having an outside periphery, an inside periphery and at least one closure gap;

a wrench housing which encompasses the wrench enclosure within an inside periphery within which the wrench enclosure rotates;

the wrench housing having an outside periphery that is adapted to predetermined wrench applications;

closure portions having predetermined curvature oppositely disposed from the closure gap on the outside periphery of the wrench enclosure;

housing portions having predetermined curvature on the inside periphery of the wrench housing at positions oppositely disposed circumferentially external from the closure portions;

the closure portions being structured for engagement by housing portions and the housing portions being structured to engage the closure portions by rotation of the wrench housing against a fastener member positioned in the wrench enclosure; and a plurality of flat fastener-member contact surfaces with predetermined fastener-grasping orientation on the inside periphery of the wrench enclosure;

wherein the wrench enclosure has a single closure gap circumferentially intermediate a plurality of wrench-enclosure cam configurations on a housing-contact side of the outside periphery of the wrench enclosure;

the inside periphery of the wrench housing has a plurality of housing cams having housing cam configurations; and the wrench-enclosure cam configurations are oppositely disposed from the housing cam configurations.

18. A grip-tightener wrench as described in claim 17 wherein:

the plurality of wrench-enclosure cams is two;

a first of the two wrench-enclosure cams is positioned on a first side of the enclosure gap;

a second of the two wrench-enclosure cams is positioned on a second side of the enclosure gap;

the plurality of housing cams is two;

a first of the two housing cams is positioned on a first side of the gap;

a second of the two housing cams is positioned on a second side of the gap; and the wrench-enclosure cams are oppositely disposed from the housing cams.

19. A grip-tightener wrench as described in claim 18 wherein:

the wrench-enclosure cam configurations are enclosure cam valleys that are extended inward radially and the housing cam configurations are housing cam peaks extended into the enclosure cam valleys.

20. A grip-tightener wrench as described in claim 18 wherein:

the wrench-enclosure cam configurations are enclosure cam peaks that are extended outward radially and the housing cam configurations are housing cam valleys which receive the enclosure cam peaks.

21. A grip-tightener wrench as described in claim 18 wherein:

the inside periphery of the wrench enclosure is a plurality of wrench-enclosure walls.

22. A grip-tightener wrench as described in claim 18 wherein:

the inside periphery of the wrench enclosure is a plurality of corners of wrench-enclosure walls.

23. A grip-tightener wrench as described in claim 18 wherein:

the inside periphery of the wrench enclosure is a plurality of selectively material-penetrative wrench-enclosure edges.

24. A grip-tightener wrench comprising:

a wrench enclosure having an outside periphery, an inside periphery and at least one closure gap;

a wrench housing which encompasses the wrench enclosure within an inside periphery within which the wrench enclosure rotates;

the wrench housing having an outside periphery that is adapted to predetermined wrench applications;

closure portions having predetermined curvature oppositely disposed from the closure gap on the outside periphery of the wrench enclosure;

housing portions having predetermined curvature on the inside periphery of the wrench housing at positions oppositely disposed circumferentially external from the closure portions;

the closure portions being structured for engagement by housing portions and the housing portions being structured to engage the closure portions by rotation of the wrench housing against a fastener member positioned in the wrench enclosure; and a plurality of flat fastener-member contact surfaces with predetermined fastener-grasping orientation on the inside periphery of the wrench enclosure;

the closure portions are stop appendages extended outward radially from the wrench enclosure at oppositely disposed sides of a single closure gap;

the outside periphery of the wrench enclosure is rounded at opposite circumferential sides of the stop appendages;

the housing portions are stop walls extended inward radially from the wrench housing at opposite circumferential ends of a stop channel in which the stop appendages travel rotationally; and the inside periphery of the wrench housing is rounded to receive the outside periphery of the wrench enclosure with sliding contact.

25. A grip-tightener wrench as described in claim 24 wherein:

the plurality of fastener-member contacts are a plurality of wrench-enclosure walls.

26. A grip-tightener wrench as described in claim 25 wherein:

the single closure gap is positioned in one of the wrench-enclosure walls.

27. A grip-tightener wrench as described in claim 25 wherein:

the single closure gap is positioned at a corner of two of the wrench-enclosure walls.

28. A grip-tightener wrench as described in claim 24 wherein:

the plurality of fastener-member contacts are a plurality of selectively material-penetrative wrench-enclosure edges.

* * * * *